(12) United States Patent
Stephan

(10) Patent No.: US 12,331,788 B2  
(45) Date of Patent: Jun. 17, 2025

(54) PROCESS FOR CONNECTING FUNCTIONAL ELEMENTS TO A SHAFT

(71) Applicant: LIST TECHNOLOGY AG, Arisdorf (CH)

(72) Inventor: Oskar Stephan, Hockenheim (DE)

(73) Assignees: LIST AG, Arisdorf (CH); BASF SE, Ludwigshafen (DE)

( * ) Notice: Subject to any disclaimer, the term of this patent is extended or adjusted under 35 U.S.C. 154(b) by 259 days.

(21) Appl. No.: 16/747,098

(22) Filed: Jan. 20, 2020

(65) Prior Publication Data

US 2020/0191206 A1   Jun. 18, 2020

Related U.S. Application Data

(63) Continuation of application No. 14/358,393, filed as application No. PCT/EP2012/072739 on Nov. 15, 2012, now Pat. No. 10,539,191.

(30) Foreign Application Priority Data

Nov. 16, 2011   (EP) .................................... 11189327

(51) Int. Cl.  
B23K 9/00       (2006.01)  
B01F 27/07      (2022.01)  
B01F 27/072     (2022.01)  
B01F 27/1121    (2022.01)  
B02C 4/30       (2006.01)  
B02C 13/28      (2006.01)  
B23K 20/10      (2006.01)  
B23K 31/02      (2006.01)  
E02F 9/28       (2006.01)  
F16D 1/027      (2006.01)

(52) U.S. Cl.  
CPC ............ *F16D 1/027* (2013.01); *B01F 27/071* (2022.01); *B01F 27/0722* (2022.01); *B01F 27/0724* (2022.01); *B01F 27/1121* (2022.01); *B02C 4/30* (2013.01); *B02C 13/2804* (2013.01); *B23K 9/0026* (2013.01); *B23K 20/10* (2013.01); *B23K 31/022* (2013.01); *E02F 9/2866* (2013.01)

(58) Field of Classification Search  
None  
See application file for complete search history.

(56) References Cited

FOREIGN PATENT DOCUMENTS

CN    202028439 U  * 11/2011  
EP    1621685 A1     2/2006  
EP    2278078 A2     1/2011

OTHER PUBLICATIONS

Mexican examination report for Application No. MX/a/2014/005764 dated Aug. 8, 2016.

* cited by examiner

*Primary Examiner* — Devang R Patel  
(74) *Attorney, Agent, or Firm* — Bachman & LaPointe, P.C.

(57) ABSTRACT

A method for connecting functional elements (14) to a shaft (10, having the following steps: (a) forming elevations (12) for receiving the functional elements (14), said elevations (12) being machined out of the shaft (10) by removing material, and (b) welding the functional elements (14) to the elevations (12) on the shaft (10).

11 Claims, 4 Drawing Sheets

PROCESS FOR CONNECTING FUNCTIONAL ELEMENTS TO A SHAFT

CROSS-REFERENCE TO RELATED APPLICATION

This is a continuation application of U.S. patent application Ser. No. 14/358,393, filed May 15, 2014, the disclosure of which is incorporated by reference herein in its entirety as if set forth at length.

BACKGROUND OF THE INVENTION

The invention relates to a process for connecting functional elements to a shaft, to a shaft produced by the process according to the invention and to the use of said shaft in a comminutor.

Apparatuses such as, for example, mixers, kneaders, stirrers or comminutors comprise shafts on which various functional elements are received. Examples of functional elements are bars, blades, arms, hooks, journals, helices, paddles, knives or studs. By the selection of the functional element, the shaft can be adapted to the required tasks.

On account of the size and complexity of the parts, the functional elements and the shaft are not generally produced from one piece. It is therefore necessary to connect the functional elements to the shaft using a suitable joining process. The joining processes include, by way of example, pressing-in, soldering and welding.

In the case of pressing-in, the two parts being joined are elastically deformed in the presence of force and pressed into one another. Undesirable release is prevented by a force fit, and the two parts being joined can be separated from one another again by applying sufficient force.

In the case of soldering, the two parts being joined are connected to one another by melting a solder. The melting temperature of the solder here is considerably lower than the melting temperature of the parts to be joined.

In the case of welding, the two parts being joined are heated to above the melting temperature thereof, such that they are firmly connected to one another following resolidification. Additional material may optionally be introduced in this case by way of a weld filler. By the fusion of the two parts being joined, it is possible to produce a very firm integral bond. The welding can be carried out with the aid of various techniques, for example by means of fusion gas welding, arc welding or metal inert gas welding.

Since it is possible to achieve very firm integral bonds between a functional element and a shaft by welding, the welding processes are preferred to other joining techniques. In order to make a welded joint between a functional element and a shaft, grooves for receiving the functional elements are cut into the shaft. Then, the functional elements are placed into the grooves and connected to the shaft by way of an all-round welded seam. This process has the disadvantage that the faces of the components placed in the groove cannot be reached, and therefore the faces placed in the groove cannot be connected to the shaft by a welding process. In addition, each welding operation gives rise to what is known as a metallurgical notch. In the event of loading, microcracks, which can later lead to fracture, can form starting from the metallurgical notch. It is problematic in this respect that this metallurgical notch coincides with a shaped notch, which here is formed by the groove. As a result of the groove, the material is weakened at this site and represents a potential site of fracture. Tearing of the welded joint between a functional element and the shaft must be prevented, however, since this leads to the failure of the component and therefore to a stoppage in production.

It is an object of the invention to provide a process for connecting functional elements to a shaft which reduces the risk of fracture of the welded joint between the functional element and the shaft. In this case, the intention in particular is to avoid the co-occurrence of a shaped notch and a metallurgical notch. It is a further object of the invention to provide a robust shaft with bars received on the shaft for use in a comminutor.

SUMMARY OF THE INVENTION

The object is achieved by a process for connecting functional elements to a shaft which comprises the following steps:
(a) elevations for receiving the functional elements are formed, the elevations being worked out of the shaft by material removal,
(b) the functional elements are welded to the elevations on the shaft.

In the first process step (a), the shaft is prepared for the subsequent welding operation. To this end, elevations are worked out of the shaft by removing material. The material can be removed using any suitable process known to a person skilled in the art. Suitable processes include chip-forming processes such as, for example, milling and turning. It is likewise possible to produce the shaft with elevations formed thereon by a primary forming process, for example casting. It is further possible to use a deformation process for forming the elevations, for example forging. It is thereby possible to produce the individual elevations and the shaft from one piece. As a result, it is possible to avoid the formation of a metallurgical notch on the surface of the shaft, as would arise if an elevation were to be welded on. Furthermore, it is not necessary to form a groove on the surface of the shaft, as a result of which weakening of the shaft at this point is likewise avoided.

In the next process step, the functional elements are welded to the elevations on the shaft. Examples of functional elements are bars, blades, arms, hooks, journals, helices, paddles, knives or studs. In this case, the welding is performed in the form of a butt joint, in which the end faces of the parts to be connected butt directly against one another. The metallurgical notch which forms during welding is thereby located between the elevation and the functional element, and no longer lies directly on the surface of the shaft. The co-occurrence of a metallurgical notch and a shaped notch predefined by the geometry or shape is thereby avoided. A further advantage is the improved accessibility of the welded seam which is produced. A welded seam between an elevation and a functional element is accessible over an opening angle of about 180°. By contrast, a welded seam lying directly on the surface of the shaft is accessible only with an opening angle of about 90°.

The improved accessibility makes it possible for the functional elements to be welded to the elevations on the shaft with full attachment. In this respect, the regions of the elevation and of the functional element which encounter one another are welded completely to one another, and an uninterrupted integral bond is produced. In the loaded state of the functional elements, this makes an optimum flow of forces possible over the entire face on which the functional elements meet with the elevations.

The welded seam between an elevation and a functional element can be produced using any suitable seam course known to a person skilled in the art. By way of example, the seam can be in the form of an X seam, a double-Y seam, a double-U seam or a double-V seam. When the welded joint is in the form of a full attachment, an X seam is preferred for the seam course. A criterion for the selection of the optimum seam course are the geometrical dimensions of the functional element and/or of the elevation. Before the seam is produced, the elevations on the shaft and/or the functional elements are prepared. In this case, the shape of the seam is prepared by cutting or grinding, for example. Here, it is preferable that the elevations on the shaft and/or the functional elements are whetted with few notches, i.e. with shaped notches being avoided, during preparation of the seam. As a result, possible starting points for cracks are avoided.

In a preferred embodiment of the process, the welded seams are checked after welding by ultrasound, by X-rays, by dye penetration tests and/or by another non-destructive examination process. It is thereby possible to ensure that the welded seam has been made to the required quality. In this respect, the particularly good accessibility of the welded seam again has a positive effect.

The selection of the material from which the functional elements and/or the shaft are manufactured has a major influence on the later durability of the shaft. It is therefore preferable to manufacture the shaft and/or the functional elements from a duplex steel. Duplex steels are distinguished by a high strength combined with a high ductility. Examples of suitable steels are duplex steel 1.4462, duplex steel 1.4362 or other high-strength weldable steels.

The shaft and the functional elements are preferably manufactured from the same material. It is particularly preferable for both to be manufactured from a duplex steel.

When making the welded seams, it is possible to use a weld filler. In this respect, it is preferable for the weld filler to be identical to the material of the shaft and/or of the functional elements. In a preferred variant of the process, the same material is used both for the shaft and the functional elements and for the weld filler.

A shaft produced by the process described above has elevations on which functional elements are received by welding, the elevations and the shaft being designed in one piece. The functional elements make it possible for the shaft to be adapted to the necessary requirements. Examples of functional elements are bars, blades, arms, hooks, journals, helices, paddles, knives or studs.

On account of the positive properties which have already been described, it is preferable for the shaft and/or the functional elements to be manufactured from duplex steel, for example from duplex steel 1.4462 or duplex steel 1.4362.

In one embodiment of the shaft, the shaft and the functional elements are manufactured from the same material.

The shaft is used with preference in a comminutor. Depending on the material to be comminuted, and depending on whether this material is to be milled, crushed, cut, chopped, smashed or ground, suitable functional elements are selected.

Shafts produced by the process according to the invention can be used in all apparatuses in which shafts with functional elements fastened thereon are received, for example mixers, kneaders, stirrers or comminutors.

It is particularly preferable for the shaft to be used in apparatuses for producing superabsorbents, for example in a mixing kneader and in a cruciform-vane comminutor. Superabsorbents are polymers which can absorb many times their own weight of liquid. Superabsorbents are generally used in the form of a coarse-grained powder, for example in diapers, dressings, various hygiene articles, etc. The superabsorbents include, in particular, poly(meth)acrylates.

To produce the poly(meth)acrylates, a monomer solution and an initiator are introduced as reactants into a mixing kneader. By way of example, such a mixing kneader comprises two axially parallel, rotating shafts, the surfaces of which receive disk faces with kneading bars arranged on their periphery. The reactants are mixed by the mixing kneader and poly(meth)acrylate is produced as the product from the reactants in a polymerization reaction. The product is thoroughly kneaded and then torn up and comminuted.

The poly(meth)acrylate leaves the mixing kneader in the form of lumps of gel-like consistency. The gel-like lumps pass into a gel bunker, from which they are placed onto a belt dryer using a swivel belt. The belt dryer extracts liquid from the gel-like lumps at a temperature of about 200° C. The dried lumps of poly(meth)acrylate then pass into a comminutor in the form of a cruciform-vane comminutor.

This cruciform-vane comminutor comprises a shaft on which a multiplicity of bars are received. In addition to the bars arranged on the shaft, the cruciform-vane comminutor comprises a multiplicity of fixedly mounted bars which engage into interstices of the bars arranged on the shaft. The lumps of poly(meth)acrylate which are introduced into the comminutor fall onto the fixedly mounted bars, and remain lying thereon. The lumps are smashed by the bars which co-rotate with the shaft.

Following passage through the cruciform-vane comminutor, the coarsely comminuted poly(meth)acrylate is supplied to a mill via a pneumatic transport system. Here, the poly(meth)acrylates are ground further until the product is produced in the form of a powder.

To smash lumps of poly(meth)acrylates in a comminutor, it is suitable to use bars as the functional elements, for example. The bars have a cuboidal form, the bar having only a small thickness and a small end face in relation to its length. During the production of the shaft, this bar is connected by welding to an elevation on the shaft at its end face. In this case, the face of the elevation can coincide with the end face of the bar, although embodiments are also possible in which the face of the functional elements is larger than the end face of the bar. The shaft provided with the bars is used for comminuting the poly(meth)acrylates in a cruciform-vane comminutor. In addition to the bars arranged on the rotating shaft, the cruciform-vane comminutor is also provided with fixedly mounted bars. If lumps of poly(meth)acrylate are introduced into the cruciform-vane comminutor, they are smashed between the fixedly mounted bars and those bars which rotate with the shaft. As a result of the particular form of the welded seams, the shaft according to the invention has a particularly high reliability and service life.

BRIEF DESCRIPTION OF THE DRAWINGS

The invention is described in more detail hereinbelow with reference to the drawings.

DETAILED DESCRIPTION

Figure 1:
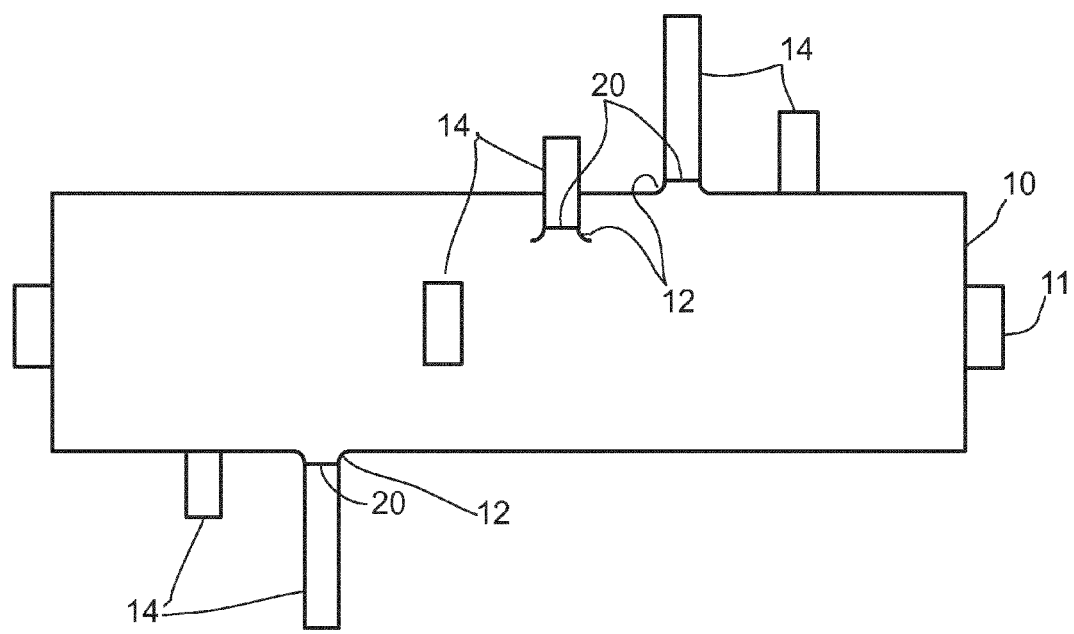
FIG. 1 shows a shaft with elevations which have been worked out of the latter and on which functional elements in the form of bars have been arranged.

FIG. 1 shows a shaft with elevations which have been worked out of the shaft and on which functional elements are connected to the shaft.

FIG. 1 shows a substantially circular-cylindrical shaft 10. A journal 11, with which the shaft can be received in a bearing, is located at each of the end faces of the shaft. Elevations 12 are distributed over the lateral surface of the shaft 10. The elevations 12 and the rest of the shaft 10 have been produced from one piece. Each elevation 12 receives a functional element, which, in the embodiment shown in FIG. 1, are in the form of bars 14. The bars 14 have a substantially cuboidal form, with the longest side being arranged perpendicular to the axis of the shaft 10 on the elevations 12. The bars 14 are welded to the elevations 12. The welded seams 20 are shown in more detail in FIGS. 2 and 3.

Figure 2:
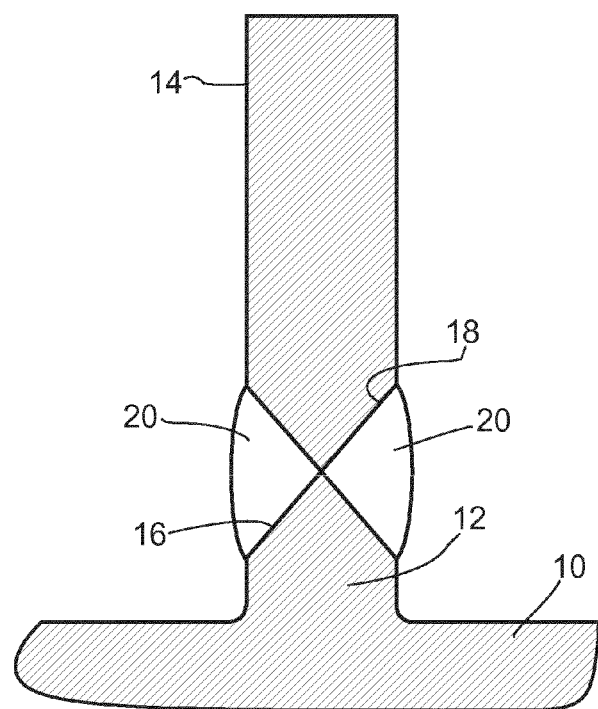
FIG. 2 is a sectional illustration from the side showing a functional element connected by welding to an elevation on the shaft.

FIG. 2 is a sectional illustration from the side showing a functional element connected via a welded seam to an elevation on the shaft.

FIG. 2 shows an elevation 12 which has been worked out of a shaft 10 by material removal. As a result, the elevation 12 and the shaft 10 are formed in one piece. A functional element, which is in the form of a bar 14, is connected to the elevation 12 via a welded seam 20. In the embodiment shown in FIG. 2, the welded seam 20 for connecting the bar 14 to the elevation 12 on the shaft is in the form of an X seam. To form the X shape of the seam, the faces 18 of the bar 14 and also the faces 16 of the elevation 12 have been whetted. As a result of this configuration of the welded seam 20, the bar 14 is connected to the elevation 12 with full attachment, i.e. an integral bond is made with the elevation 12 over the entire cross-sectional area of the bar 14. An optimum flow of forces in the event of loading is ensured as a result. In further embodiments of the invention, it is also possible, depending on the dimensions of the functional element, or of the bar 14, to use another form of the welded seam 20. Further examples for a form of the welded seam 20 are V seams, U seams, double-U seams or a double-V seam.

Figure 3:
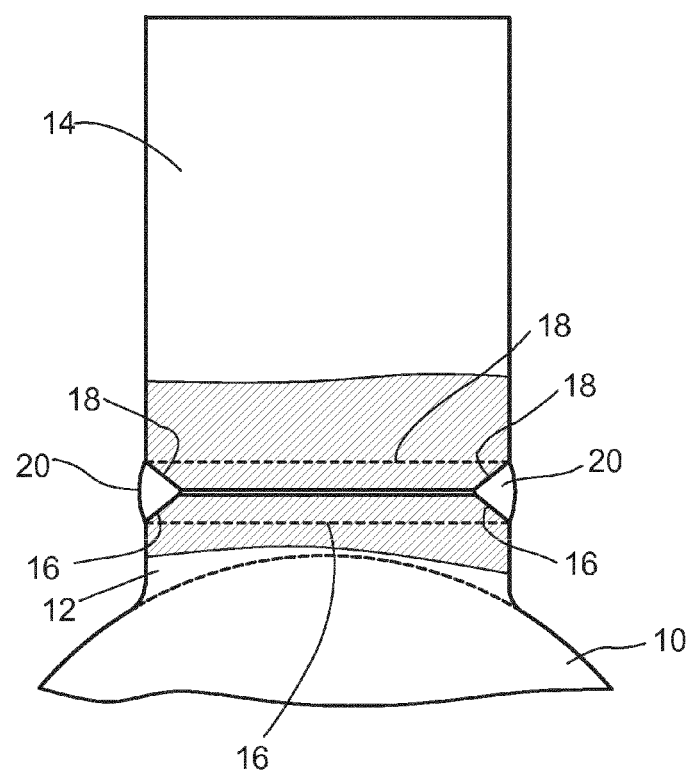
FIG. 3 is a sectional illustration from the front showing a functional element connected by welding to an elevation on the shaft.

FIG. 3 is a sectional illustration from the front showing a bar 14 connected via a welded seam 20 to an elevation 12.

FIG. 3 shows a functional element which is in the form of a bar 14 and is connected via a welded seam 20 to an elevation 12. The elevation 12 is worked out of the shaft 10 by material removal. As a result, the elevation 12 and the shaft 10 are formed in one piece. As can be gathered from the illustration in FIG. 3, the welded seam preparations are carried out on all four sides both on the bar 14 and on the elevation 12. To this end, the bar 14 has been provided with the whetted areas 18 and the elevation 12 with the whetted areas 16. In conjunction with an X seam, as shown in FIG. 2, it is possible to establish a complete integral bond between the bar 14 and the elevation 12.

Figure 4:
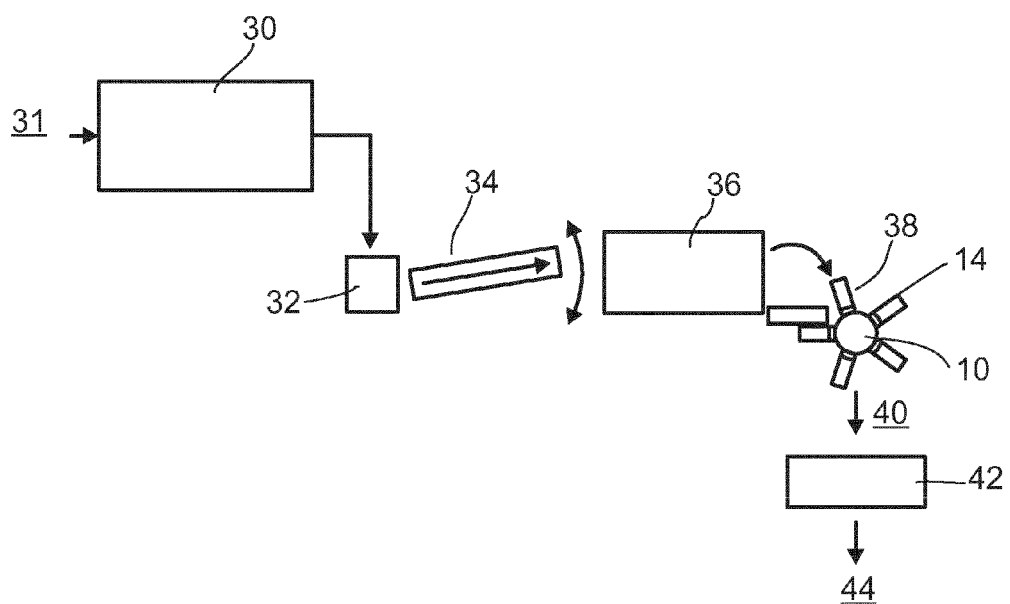
FIG. 4 is a diagrammatic illustration of the process for producing poly(meth)acrylates.

FIG. 4 is a diagrammatic illustration of a process for producing poly(meth)acrylates.

The sequence of a process for producing poly(meth)acrylates can be gathered from the diagrammatic illustration in FIG. 4. The reactants 31 for producing the poly(meth)acrylates are introduced into a mixing kneader 30. By way of example, the mixing kneader 30 comprises two axially parallel, rotating shafts, the surfaces of which receive disk faces with kneading bars arranged on their periphery. Poly(meth)acrylate is produced as the product in a polymerization reaction and leaves the mixing kneader 30 in the form of lumps of gel-like consistency.

The gel-like lumps pass into a gel bunker 32, from which they are placed onto a belt dryer 36 using a swivel belt 34. The belt dryer 36 extracts liquid from the gel-like lumps at a temperature of about 200° C. The dried lumps of poly(meth)acrylate then pass into a comminutor in the form of a cruciform-vane comminutor.

This cruciform-vane comminutor 38 comprises a shaft 10 on which a multiplicity of bars 14 are received. The bars 14 have been welded to the shaft 10 with the aid of the process according to the invention. In addition to the bars 14 arranged on the shaft 10, the cruciform-vane comminutor comprises a multiplicity of fixedly mounted bars which engage into interstices of the bars 14 arranged on the shaft 10. The lumps of poly(meth)acrylate which are introduced into the comminutor 38 fall onto the fixedly mounted bars, and remain lying thereon. The lumps are smashed by the bars 14 which co-rotate with the shaft 10.

Following passage through the cruciform-vane comminutor 38, the coarsely comminuted poly(meth)acrylate is supplied to a mill 42 via a pneumatic transport system 40. Here, the poly(meth)acrylates are ground further until the product 44 is produced in the form of a powder.

In addition to the process mentioned here, by way of example, for producing poly(meth)acrylates, shafts produced by the process according to the invention can be used in all apparatuses in which shafts with functional elements fastened thereon are received, such as for example mixers, kneaders, stirrers or comminutors. In the process for producing poly(meth)acrylates, the shaft according to the invention can also be used in the mixing kneader 30. In this case, disks with kneading bars arranged on their periphery are selected as the functional elements and are welded to the shaft according to the process according to the invention.

The invention claimed is:

1. A process for connecting functional elements to a shaft of a mixer, kneader, stirrer or comminutor for liquid or solid materials, comprising the following steps:
    (a) forming elevations on a shaft of a mixer, kneader, stirrer or comminutor for receiving functional elements wherein the elevations are formed by providing a circular-cylindrical shaft having an outer cylindrical surface without blade roots and removing material from the outer cylindrical surface of the circular-cylindrical shaft so as to define the elevations as continuous integral portions of the shaft; and
    (b) welding the functional elements to the elevations on the shaft, wherein the functional elements are bars, blades, arms, hooks, journals, helices, paddles, knives or studs for processing the liquid or solid materials.

2. The process of claim 1, wherein the mixer, kneader, stirrer or comminutor is a comminutor for milling, crushing, cutting, chopping, smashing or grinding liquid and solid materials.

3. The process of claim 1, wherein the mixer, kneader, stirrer or comminutor is a mixing kneader for mixing reactants into lumps of gel-like consistency.

4. The process according to claim 1, wherein the functional elements are welded to the elevations on the shaft with full attachment.

5. The process according to claim 1, wherein the elevations on the shaft and/or the functional elements are whetted with few notches during preparation for welding.

6. The process according to claim 1, wherein the functional elements are welded to the elevations on the shaft with one of an X seam, a double-U seam, a double-Y seam, and a double-V seam.

7. The process according to claim 1, including checking welded seams after welding by one of ultrasound, by X-rays, by a dye penetration test and another non-destructive examination process.

8. The process according to claim 1, including manufacturing the shaft and/or the functional elements from a duplex steel.

9. The process according to claim 6, including manufacturing the shaft and the functional elements from the same material.

10. The process according to claim 8, including using a weld filler for welding the functional elements to the elevations on the shaft, wherein the material of the weld filler is identical to the material of the shaft and of the functional elements.

11. The process according to claim 1, further comprising operating the mixer, kneader, stirrer or comminutor with the shaft to process the liquid or solid materials with the functional elements.

\* \* \* \* \*